UNITED STATES PATENT OFFICE.

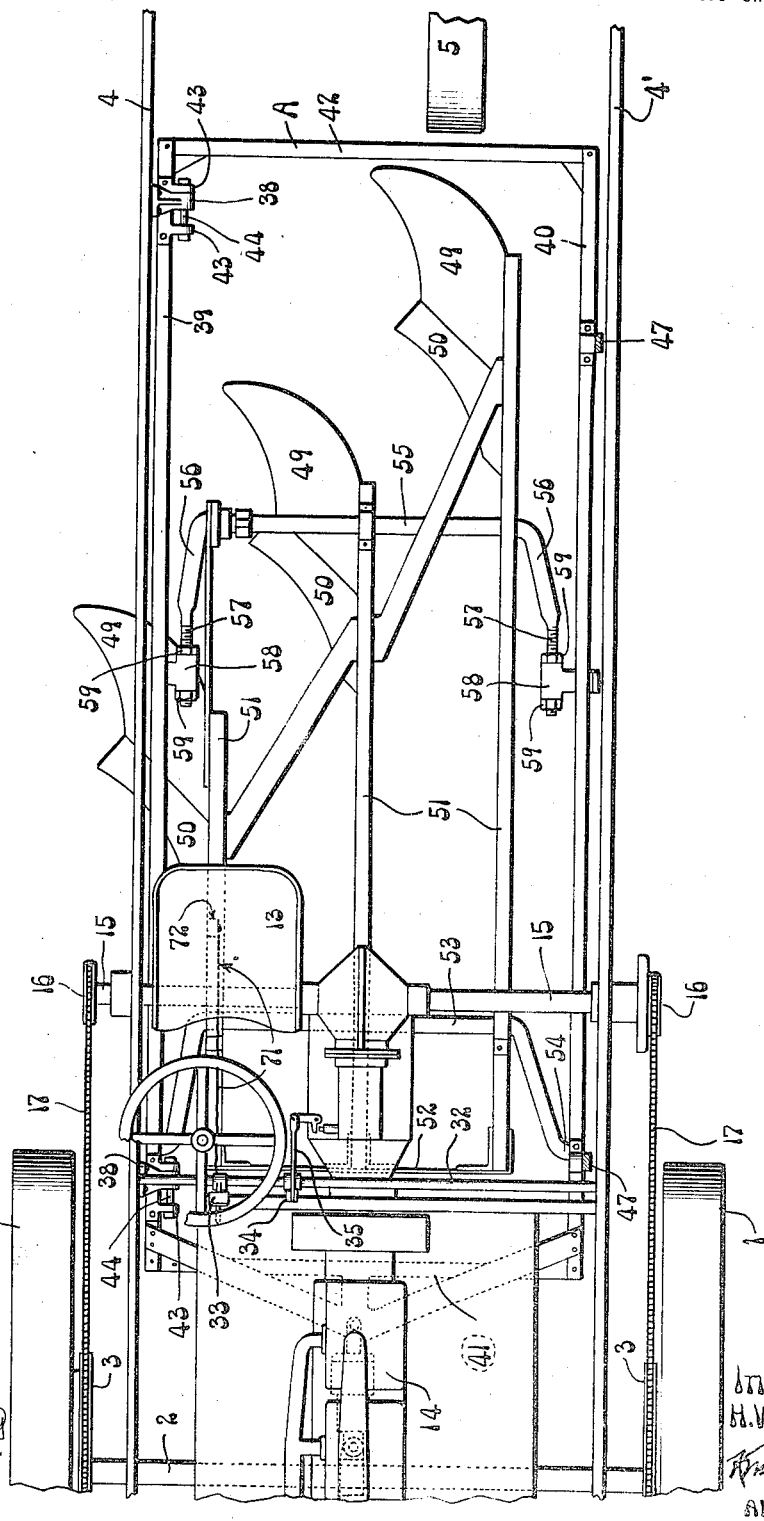

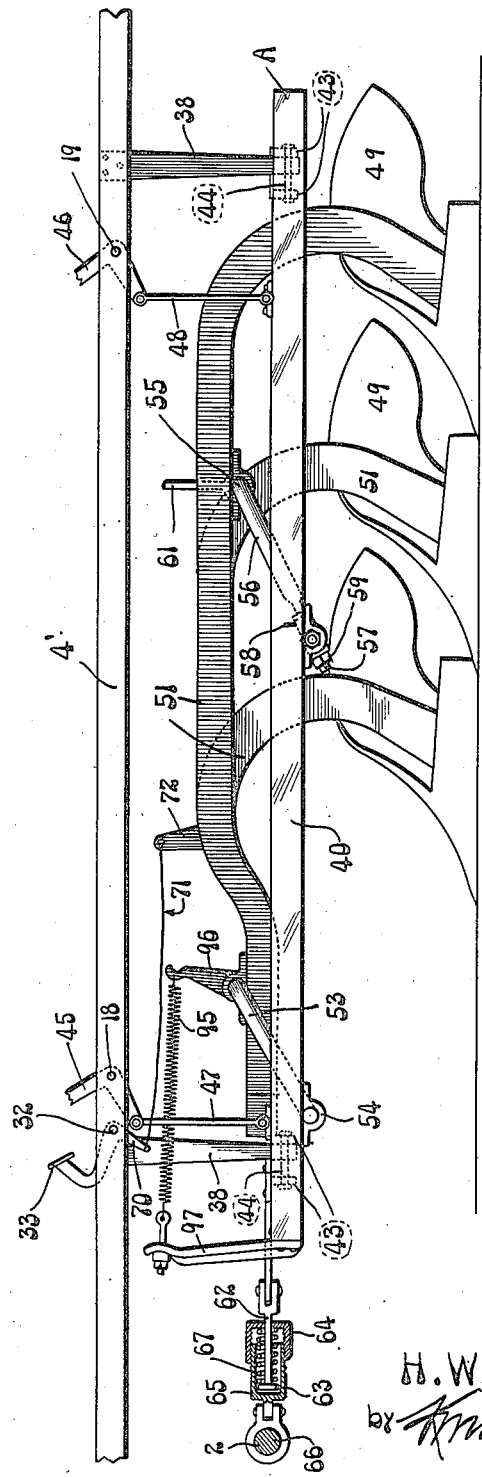

HENRY W. KARDELL, OF ST. LOUIS, MISSOURI.

TRACTION-PLOW.

1,183,465.　　　Specification of Letters Patent.　　Patented May 16, 1916.

Original application filed May 23, 1913, Serial No. 769,356. Divided and this application filed June 25, 1914. Serial No. 847,348.

*To all whom it may concern:*

Be it known that I, HENRY W. KARDELL, a citizen of the United States of America, and a resident of the city of St. Louis and State of Missouri, have invented certain new and useful Improvements in Traction-Plows, of which the following is a full, clear, and exact description, reference being had to the accompanying drawings, forming a part of this specification.

My invention relates to a traction plow and has for its object the production of means for automatically stopping the tractor when the plow carried thereby strikes an obstruction such as a large rock or a tree root.

My improved traction plow preferably comprises a plow carrying member slidably supported at one side by the tractor, and suspended from the tractor at its opposite side so that the tractor may, for a limited distance, travel independently of the plow; combined with means for automatically stopping the tractor when the tractor advances independently of the plow.

This application is a division of an application for patent filed by me May 23, 1913, Serial No. 769,356, tractors.

Figure I is a top or plan view of my traction plow, the rear portion of the tractor being broken away. Fig. II is a side elevation of the plow carrying member, showing it attached to the tractor frame.

The tractor of my traction plow includes a pair of front ground wheels 1 secured to an axle 2, the ground wheels being supplied with suitable means such as sprocket wheels 3 to which power is transmitted to impart rotation to the said ground wheels from the engine of the tractor, as will hereinafter more fully appear. The tractor frame comprises longitudinal side beams 4 and 4' extending from front to rear of the frame. The tractor frame may be supported at its rear end in one or more wheels 5.

14 designates an engine of any suitable description carried by the tractor frame to supply the necessary power for operating the tractor and the plow element carried by said tractor.

15 designates a jack shaft operable by the engine 14. This jack shaft extends transversely of the tractor and is journaled in the side beams 4 and 4' of the tractor frame. The jack shaft serves as a medium for driving the ground wheels 1 and as a convenient means for transmitting power from said jack shaft to the ground wheels, I mount upon said jack shaft adjacent its ends sprocket wheels 16 that receive endless drive chains 17 operable on the sprocket wheels 3.

32 is a clutch operating rock shaft extending transversely of the tractor frame to which it is journaled. For convenience of description, the function of this shaft which is located in front of the driver's seat 13, may be at this time set forth only in so far as it is used to throw the clutch of the transmission gear of the tractor in discontinuing the travel of such tractor under normal conditions. In this connection the rock shaft 32 is provided with a pedal 33 that may be operated by foot pressure, and with a crank arm 34 having fitted to it a connecting rod 35 leading to a clutch throwing device of any suitable and ordinary construction.

38 are hangers depending from the longitudinal side beam 4 of the tractor frame and by which the plow frame about to be described is supported at one of its sides. The plow frame A is a rectangular structure comprising side bars 39 and 40, a front bar 41, and a rear end bar 42. This frame is suspended beneath the tractor frame and its side bar 39 is hinged to the hangers 38 by shackles, each shackle comprising a pair of arms 43 spaced from each other, and a pivot rod 44 mounted in said arms and extending loosely through the lower ends of the hanger 38. It may here be mentioned that with a particular object in view to be hereinafter specified the width of the hangers 38 is less than the space between the shackle arms 43, a construction that permits one side of the plow frame to slide upon the pivot rods 44. The opposite side of the plow frame is adjustably supported by lever arms 45 and 46 fixed to rock shafts 18 and 19, and hanger links 47 and 48 having pivotal connection at their ends with said lever arms and with side bar 40 of the plow frame A. This construction permits the plow frame A to be raised and lowered at the side at which the frame side bar 40 is located, the hangers 38 serving as supporting members for the frame during the raising and lowering movements which may be accomplished by operating the lever arms 45 and 46 in any suitable manner.

I have herein shown my plow as including a plurality of plows proper arranged in gang and will in the description hereinafter given, describe a gang plow structure with the understanding that I do not limit myself to the use of any particular plows proper.

The plows proper herein shown are arranged in a parallel series, and comprise the usual mold boards 49, shares 50, and beams 51 the latter being united at their forward ends by a cross connection 52. The plow beams 51 are pivotally connected at their forward ends to the side bars 39 and 40 of the plow frame A by a U-shaped stirrup 53 the arms of which are journaled to the side bars of the plow frame at 54. The plow beams are also pivotally connected to the side bars of the plow frame by a rear stirrup 55 of U-shape the arms 56 of which are provided with screw threaded ends 57 extending through pivot blocks 58 pivoted to the side bars of the plow frame and bearing front and rear adjusting nuts 59.

Referring now to Fig. II, it will be noted that the plows proper and plow beams 51 are supported by the U-shaped stirrups 53 and 55 and that the rear stirrup 55 is supported by the hanger link 61. The combined weight of the plows and plow beams tends to move the stirrup 53 downwardly, however, this weight is counterbalanced by a spring 95 connecting an arm 96 on the stirrup 53 to an arm 97 on the plow frame A.

One of the objects of my invention is to provide a yieldable draft connection between the plow frame A and the part of the tractor to which said plow frame is hitched, a connection of this kind being furnished to prevent injury to the plows proper, and the parts associated with them, in the event of the plow shares striking an obstruction. The draft connection between the plow frame and the draft member of the tractor, the latter being in the accompanying drawings the forward axle 2, comprises a draft rod 62 attached to the plow frame A and provided at its forward end with a head 63. The draft rod is operable on one of a pair of spring incasing members 64 and 65 which are of cup shape and have their open ends presented in opposite directions. As illustrated in the drawings the coupling member 65 extends into the coupling member 64 and said members are adjustably connected to each other in order that their combined length may be increased or diminished. The coupling member 65 is attached to the axle 2 by a suitable clip 66. Within the coupling members is a cushion draft spring 67 which surrounds the draft rod 62 and is interposed between the head 63 of said rod and the rear end wall of the coupling member 64. It will be obvious that I thus provide a construction which will permit of the plow frame A, and the plows proper carried thereby, being stopped by an obstruction while the tractor continues its forward travel to a limited degree. By making such provision, in combination with means for automatically throwing the motor of my traction plow out of action, as will be hereinafter explained, the shock caused by the striking of an obstruction is cushioned and the tractor is automatically stopped to prevent injury to the plows proper and the members associated therewith.

The means for automatically stopping the tractor when the plows proper strike an obstruction comprises an arm 70 depending from the clutch throwing shaft 32 and a cable 71 connecting said arm 70 to an arm 72 on one of the plow beams. It will be understood that the clutch throwing shaft 32 may be rocked through the medium of a pedal 33 to stop the tractor. When one of the plows strikes an obstruction the clutch throwing shaft 32 is automatically rocked to stop the tractor, the movement being accomplished in the following manner: The plows, plow beams 51, and plow frame A are prevented from advancing while the tractor frame including the side beams 4 and 4' and the front axle 2 moves forwardly a slight distance. The spring 67 is thereby compressed, and the hangers 38 to which the plow frame is pivoted slide forwardly on the pivot pins 44. The clutch throwing shaft 32 carried by the tractor frame, also moves forwardly while the post 72 remains stationary. This action tightens the cable 71 and causes the clutch throwing shaft 32 to be rotated, with the result of stopping the tractor. The tractor can then be backed a sufficient distance to free the plows from the obstruction.

I claim:—

1. In a traction plow, a tractor, a plow frame, a pivot rod connecting one side of said plow frame to said tractor, links connecting the opposite side of said plow frame to said tractor, said plow frame being suspended by said links and slidably supported by said pivot rod, and means for stopping said tractor, said means being operable automatically when the tractor moves independently of said plow frame.

2. In a traction plow, a tractor provided with depending hangers at one of its sides, pivot rods adapted to slide longitudinally in said hangers, links suspended from the opposite side of said tractor, a plow carrying member having its opposite sides connected to said pivot rods and said links, and means for automatically stopping the tractor when the tractor moves independently of said plow carrying member.

3. In a traction plow, a tractor provided with a clutch releasing member operable to stop the tractor, a plow carrying member movably connected to said tractor, a shock absorber tending to prevent said tractor from advancing independently of said plow carrying member, and an automatic stopping device including means for connecting said plow carrying member directly to said clutch releasing member.

4. In a traction plow, a tractor provided with a clutch releasing member operable to stop the tractor, a plow carrying member, hangers connecting opposite sides of said plow carrying frame to said tractor, a shock absorber tending to prevent the tractor from advancing independently of the tractor, and a flexible connection between said plow carrying member and said clutch releasing member.

HENRY W. KARDELL.

In the presence of—
M. M. APGAR,
A. J. McCAULEY.